Nov. 17, 1942.  W. A. LEBUS  2,302,653
CLOSURE DEVICE
Filed July 15, 1940  3 Sheets-Sheet 2

Witness:
V. Siljander

Inventor:
William A. Lebus
By: Hill & Hill
Attys.

Nov. 17, 1942.  W. A. LEBUS  2,302,653
CLOSURE DEVICE
Filed July 15, 1940  3 Sheets-Sheet 3
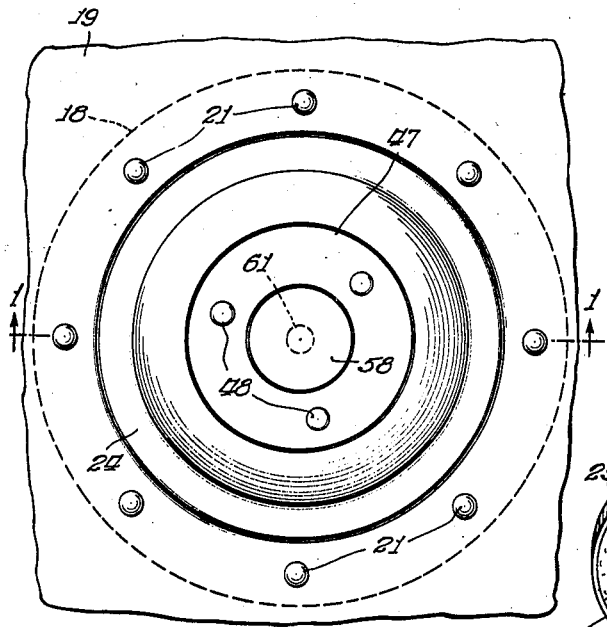
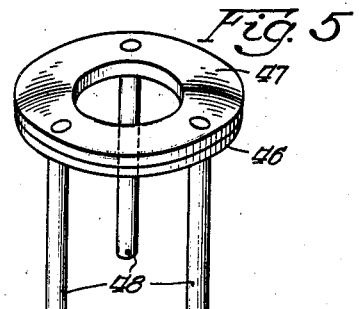
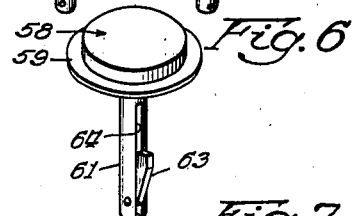
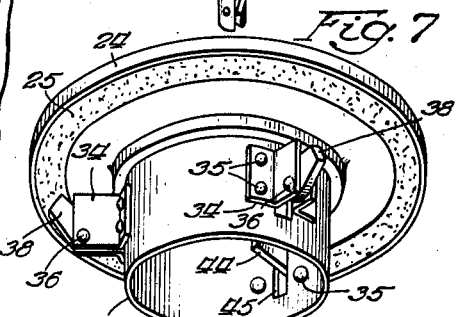
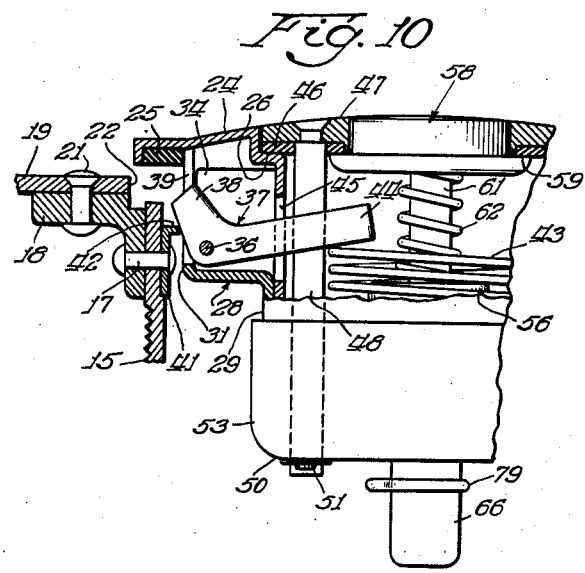
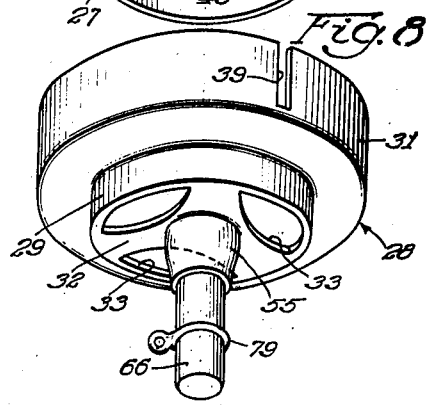
Witness:
V. Siljander
Inventor:
William A. Lebus
By: Hill & Hill
Attys.

Patented Nov. 17, 1942

2,302,653

UNITED STATES PATENT OFFICE 2,302,653

CLOSURE DEVICE

William A. Lebus, Chicago, Ill., assignor to Protectoseal Company of America, Inc., Chicago, Ill., a corporation of Illinois Application July 15, 1940, Serial No. 345,535

13 Claims. (Cl. 220—55)

This invention relates to a closure device, and particularly to a cap or cover for the filler opening of a fuel tank for aeroplanes, or the like, and is particularly adaptable to a structure wherein the tank is positioned in a wing of the plane.

One object of the present invention is to provide a novel construction and arrangement whereby the closure device may be readily and quickly secured in operative position, and readily and quickly removed therefrom.

Another object of the invention is to provide a device of the character described, which is streamlined on its exposed surface and adapted to conform, substantially, to the adjacent surface of the structure with which it is associated.

Another object of the invention is to provide a structure wherein the securing means are concealed, and wherein novel means are provided for releasing the securing means without the use of projecting portions which are objectionable, particularly when the device is used on aeroplanes or the like.

Another object of the invention is to provide a novel construction and arrangement of pressure relief and vacuum relief valves for relieving the pressure and vacuum, which may occur in a container or tank to which the present invention is applied.

Another object of the invention is to provide a novel arrangement for retaining the securing means in inoperative position and for releasing the securing means from such inoperative position when desired.

Another object of the invention is to provide a novel sealing arrangement for the closure and the respective pressure and vacuum relief valves operatively related thereto.

A further object of the invention is to provide a device of the character described, which is of simple construction, economical to manufacture, and in which the respective elements may be readily and quickly assembled in operative condition.

A still further object of the invention is to improve devices of the character described in sundry details hereinafter referred to and particularly pointed out in the appended claims.

One embodiment of the present invention is shown for illustrative purposes in the accompanying drawings, in which:

Fig. 1 is a sectional elevational view of a closure embodying features of the present invention shown in operative position to secure the closure in place, the view being taken substantially as indicated by the lines 1—1 of Figs. 2, 3 and 4, and illustrating my novel closure applied to a fluid tank intended to be supported in the wing of an aeroplane or the like;

Fig. 4 is a top plan view on a reduced scale of the structure illustrated in Fig. 1;

Fig. 5 is a perspective view of a pressure relief valve forming a part of the present invention;

Fig. 6 is a perspective view of a vacuum relief valve employed in the present structure;

Fig. 7 is a perspective view from below of a covering or cap illustrating the arrangement of latches or dogs and the support therefor in relation to the cover-ring;

Fig. 8 is a perspective view from below of the vacuum relief valve support illustrating the spider-like structure of the bottom portion thereof;

Figure 1:
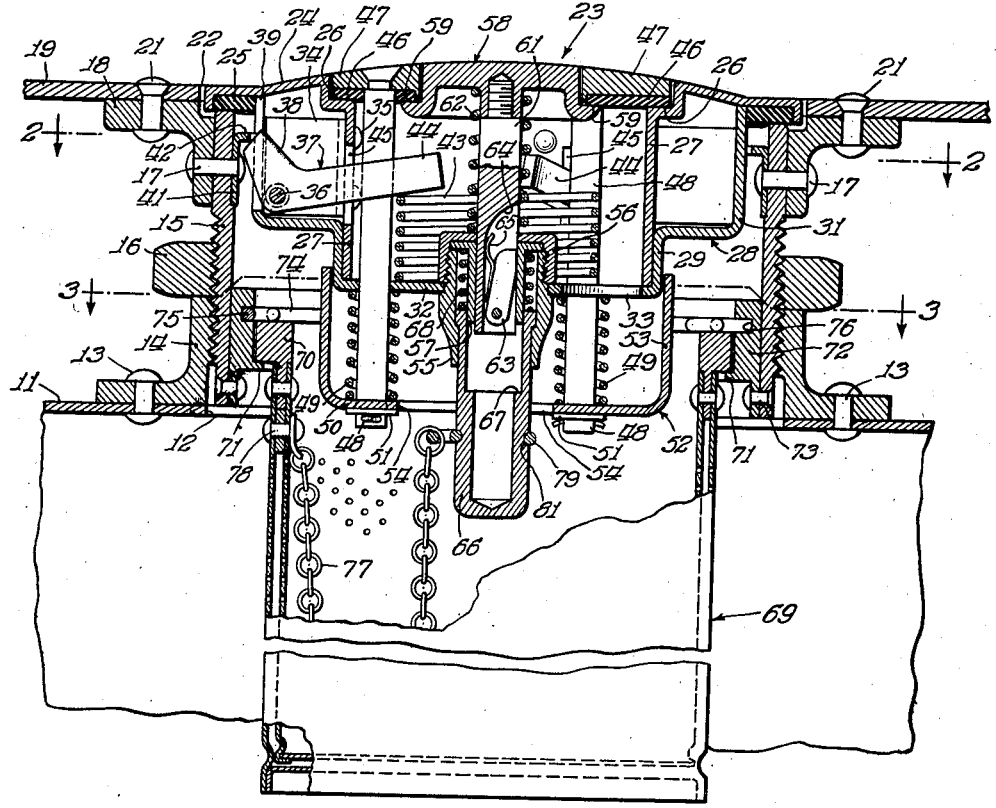
Figure 2:
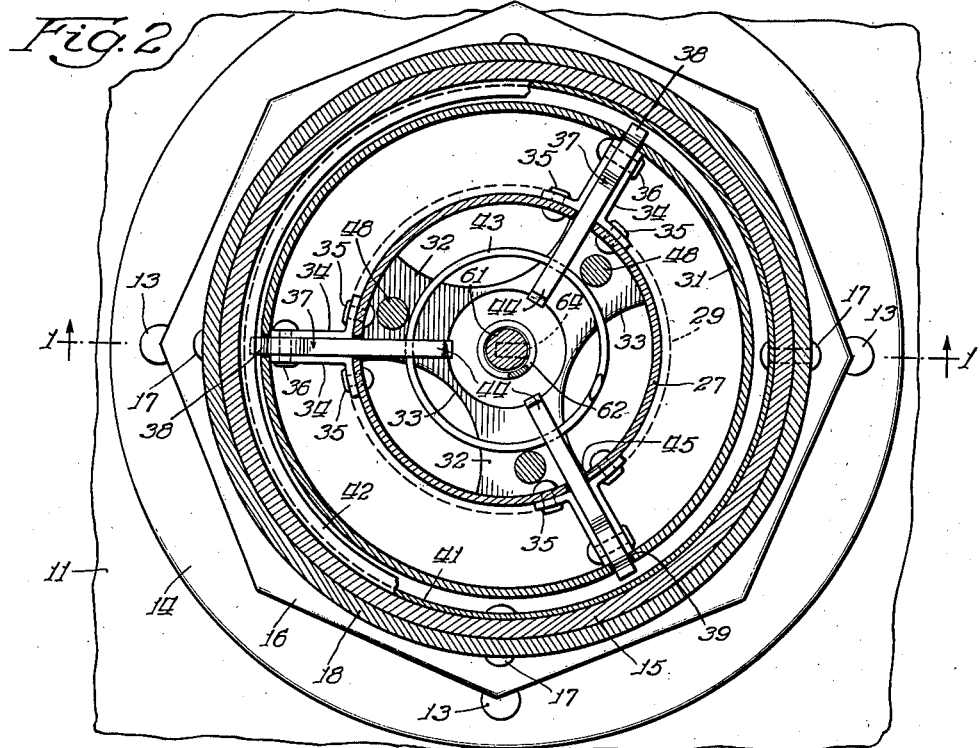
Fig. 2 is a plan sectional view of the structure illustrated in Fig. 1, and taken substantially as indicated by the line 2—2 thereof.
Figure 3:
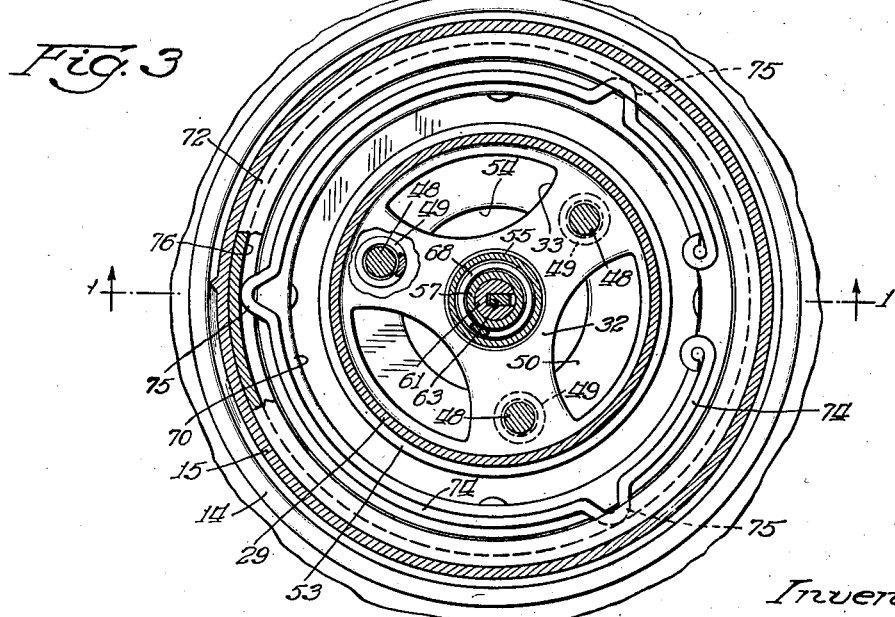
Fig. 3 is a plan sectional view taken substantially as indicated by the line 3—3 of Fig. 1.

Fig. 9 is a fragmentary sectional elevational view of a portion of the structure illustrated in Fig. 1, showing the vacuum relief valve in changed position and in relation to the retaining dogs for moving them out of operative position; and Fig. 10 is a fragmentary sectional elevational view of the closure and its support just prior to moving the closure into operative position with respect thereto.

The invention, as illustrated in the accompanying drawings, is shown in conjunction with and as applied to a tank 11 for fluid such as gasoline, or the like, and having a filler opening 12 formed therein.

Surrounding the filler opening and secured to the tank 11 by means of rivets 13 is an internally threaded collar 14 adapted to receive an externally threaded sleeve 15 forming a neck or rim portion of the filler opening and secured in operative position with respect to the sleeve 14 by means of a jam nut 16.

Mounting adjacent the upper end portion of the sleeve 15, and secured thereto by means of rivets 17 is a flanged collar 18 to which the wing skin or surface portion 19 of an aeroplane, or the like, may be secured, by means of rivets 21, the wing skin 19 of the closure supporting structure being provided with an opening 22 adapted to receive my novel closure device or member indicated, as a whole, by the numeral 23.

The closure member 23, as shown in the drawings, comprises a cover-ring or cap 24, preferably of annular form, adjacent its outer edge portion having a gasket 25 mounted therein adapted to rest on the upper edge of the rim or neck portion of the filler opening formed by the threaded sleeve 15.

Formed on the inner edge portion of the cover-ring 24 is a valve seat 26, and depending therefrom is a spacing sleeve portion 27. Surrounding the sleeve 27 is a vacuum relief valve support indicated, as a whole, by the numeral 28 having a reduced portion 29 adjacent its lower end fitting closely to and outside the sleeve 27, and having an enlarged portion 31 adjacent its upper end spaced a substantial distance from the sleeve 27, the vacuum valve support 28 having a bottom portion 32 provided with openings or air passages 33 formed therein.

For securing the cover-ring or cap 24 in operative position with respect to the sleeve 15, a plurality of annularly spaced pairs of brackets 34 are secured to the outer side of the sleeve 27 by means of rivets 35, and pivotally mounted between the brackets of the respective pairs by means of pivot pins 36 are a plurality of retaining latches or dogs indicated, as a whole, by the numeral 37, said dogs having an outer end portion 38 extending through openings 39 formed in the spaced portion 31 of the vacuum relief valve support 28 and into engagement with a cover retaining ring 41 shown, in the present instance, as having an inwardly extending flange 42 adapted to be engaged by the end portion 38 of the dogs 37, as clearly illustrated in Fig. 1. For yieldingly retaining the dogs 37 in operative position with respect to the flange 42 of the cover retaining ring 41, resilient means shown, in the present instance, as a spring 43 is mounted upon the bottom portion 32 of the vacuum relief valve support 28 and adapted to engage an inner end portion 44 of the dogs 37 extending inwardly through openings 45 of the spacing sleeve 27 and positioned above the spring 43.

Positioned within the cover-ring 23 and having a facing 46 adapted to engage the valve seat 26 of the cover-ring is a pressure relief valve 47 of ring-like form having a plurality of annularly spaced depending studs 48 secured thereto and extending downwardly therefrom through the bottom portion 32 of the vacuum valve support 28, and for yieldingly maintaining the pressure relief valve 47 in operative position with respect to the seat 26, a plurality of resilient means shown, in the present instance, as springs 49 are positioned between the bottom portion 32 of the vacuum valve support 28 and a stop 50 secured in position by a washer and cotter pin connection 51, and shown, in the present instance, as the bottom portion of a cup-like member indicated, as a whole, by the numeral 52 having its vertical side or wall portions 53 extending upwardly and surrounding the reduced portion 29 of the vacuum valve support 28, the bottom portion of the cup-like member forming the stop 50 being provided with a central opening 54 for providing passage of air or gas from within the tank to the openings 33 in the bottom portion 32 of the vacuum relief valve support 28.

Mounted, preferably, adjacent the central portion of the bottom 32 of the vacuum relief valve support 28, and secured thereto by means of a bushing 55 and associated cap 56 is a guide tube 57, and positioned preferably within the ring-like pressure relief valve 47 is an annular, inwardly opening vacuum relief valve indicated, as a whole, by the numeral 58, having a face 59 adapted to seat on the facing 46 of the pressure relief valve 47, said vacuum relief valve 58 having a stem 61 extending downwardly and into the guide sleeve 57 in a manner to be guided thereby, the vacuum relief valve 58 being provided with resilient means shown, in the present instance, as a spring 62 surrounding the stem 61 between the vacuum relief valve 58 and the cap 56 for yieldingly retaining the vacuum relief valve in operative engagement with the facing 46 of the pressure relief valve 47.

By reference to Fig. 1, and with the various parts of the structure in the positions shown therein, it will be apparent that novel means are provided for closing and sealing the filler opening of a tank, and that in the event of excessive pressure occurring within the tank, the pressure relief valve 47 may yield against the action of the springs 49 to permit the escape of such excess pressure, while in the event of a partial vacuum occurring within the tank 11, the vacuum relief valve 58 will be drawn inwardly against the action of the spring 62 to admit air to the tank and relieve the partial vacuum therein.

For removing the closure 23, including the cover-ring 24 and associated parts carried thereby, the vacuum relief valve 58 may be moved inwardly against the action of the spring 62 and into engagement with the inwardly extending portions 44 of the retaining dogs 37, and the said inwardly extending portion of the dogs moved to the position illustrated in Fig. 9 against the action of the spring 43, thereby rocking the dogs about their pivotal axes 36 and moving the end portions 38 out of engagement with the flange 42 of the retaining ring 41. The vacuum relief valve 58 and dogs 37 may be retained in their changed position by a detent 63 pivotally mounted in a recess 64 formed in the stem 61 and urged to be swung in an outwardly direction, by means of a flat leaf spring 65, into engagement with the lower end portion of the guide sleeve 57, as clearly illustrated in Fig. 9, thereby retaining the outer end portions 38 of the dogs 37 in retracted position and out of engagement with the flange 42 of the retaining ring 41. With the vacuum relief valve 58 in such position, the inner edge portion of the pressure relief valve 47 may be grasped by the fingers and the closure lifted from the upper edge of the sleeve 15 to provide access to the filler opening for filling the tank.

When it is desired to replace the closure on the rim or neck portion 15, a tubular member 66 having a shoulder 67 formed thereon and slidably mounted on the guide sleeve 57 within the bushing 55 may be moved inwardly against the action of a spring 68 in a manner to cause the shoulder 67 to force the detent 63 into the recess 64 against the action of the leaf spring 65, thereby permitting the vacuum relief valve to close under the influence of the spring 62, and the outer end portions 38 of the retaining dogs 37 to assume their distended position under the influence of the spring 43, as illustrated in Fig. 10, whereupon the closure may be positioned within the filler opening as shown in Fig. 10, and by forcing the cover-ring 24 downwardly, the dogs 37 will be rocked about their pivot by reason of contact with the flange 42 of the retaining ring 41, and when the closure is snugly seated on the upper edge portion of the sleeve 15, the dogs will assume their locking or retaining position, as illustrated in Fig. 1.

It will be apparent from the foregoing description that the present construction and arrangement provides a novel and efficient closure which may be quickly applied to and removed from a filler opening, and wherein novel means are provided for relieving both pressure and vacuum occurring in the tank to which the closure is applied.

It will be noted by reference to Fig. 1 that the upper surfaces of the cover-ring 23, pressure relief valve 47 and vacuum relief valve 58 are substantially flush or streamlined, and conform substantially to the adjacent surface of the structure with which they are associated, thereby providing a structure most suitable for use in connection with tanks mounted in the wings of aeroplanes, and also provides a most desirable arrangement wherein the retaining means and the releasing means therefor are positioned entirely below the upper or outer surface of the closure.

As is customary in the construction of tanks of the character described, a fire baffle 69 is positioned in the filler opening of the tank end, in the present instance, is shown provided adjacent its upper end with a rim portion 70 adapted to rest on an inwardly extending flange 71 formed on a baffle supporting ring 72 secured to the threaded sleeve 15 by means of rivets 73, the rim portion 70 of the baffle 69 being secured against accidental displacement with respect to the flange 71 by means of a spring ring 74 adjacent the upper side of said rim portion 70 and having projections 75 extending into an annular groove 76 formed in the inner side portion of the screen supporting ring 72.

For flexibly connecting the closure 23 to the tank 11 to avoid dropping or misplacing of the closure, a chain 77 may be connected adjacent one of its ends to the fire baffle 69 by means of a rivet 78, and at its opposite end to a ring 79 positioned in an annular recess 81 formed in the tubular member 66 of the closure structure.

It will be observed from the foregoing description that the present invention provides an efficient closure of novel construction and arrangement, which may be quickly and readily applied to and removed from the filler opening of a tank or the like, and wherein the securing means and releasing means therefor are concealed and arranged entirely within and below the upper or outer exposed surface of the closure.

Also, that novel means are provided for retaining the securing means in inoperative position when desired, and for releasing the securing means from said inoperative position.

Obviously, the present invention is not limited to the precise construction and arrangement shown and described as the same may be variously modified. Moreover, all the features of the invention need not be used conjointly as the same may be used to advantage in variously different combinations and sub-combinations.

What I claim as new and desire to secure by Letters Patent is:

1. In a device of the class described and in combination with the rim portion of a filler opening, a retaining ring mounted on said rim portion, a closure removably mounted on said rim portion, a plurality of retaining dogs mounted on said closure and engageable with said ring to retain the closure in operative position, a releasing member forming a part of the top of said closure, inwardly movable away from the exposed surface of the closure member and engageable with said dogs for disengaging the dogs from said ring to permit the removal of the closure from said rim portion, and means for retaining said releasing member in dog engaging position.

2. In a device of the class described and in combination with the rim portion of a filler opening, a retaining ring mounted on said rim portion, a closure removably mounted on said rim portion, a plurality of spring actuated retaining dogs pivotally mounted on said closure and engageable with said ring to retain the closure in operative position, releasing means movable in said closure below the exposed surface thereof and engageable with portions of said dogs projecting into the path of said releasing means for disengaging the dogs from said ring to permit the removal of the closure from said rim portion, and a detent carried by said means and cooperative with means carried on the closure for retaining said releasing means in dog engaging position.

3. In a device of the class described and in combination with the rim portion of a filler opening, a retaining ring mounted therein, a closure comprising a cover-ring removably mounted on said rim portion, a plurality of annularly spaced spring actuated retaining dogs mounted on said cover ring and engageable with said retaining ring to retain the closure in operative position, a vacuum relief valve movable in said closure and engageable with said dogs for disengaging the dogs from said retaining ring, and a detent for retaining said vacuum relief valve in dog engaging position.

4. In a device of the class described and in combination with the rim portion of a filler opening, a retaining ring mounted therein, a closure comprising a cover-ring removably mounted on said rim portion and having a spacing portion extending inwardly from said cover-ring, a plurality of annularly spaced spring actuated retaining dogs pivotally mounted on said spacing portion and engageable with said retaining ring to retain the closure in operative position, a vacuum relief valve slidably movable in said closure and engageable with said dogs for disengaging the dogs from said retaining ring, and a detent for retaining said vacuum relief valve in dog engaging position.

5. In a device of the class described and in combination with the rim portion of a filler opening, a retaining ring mounted therein, a closure comprising a cover-ring removably mounted on said rim portion and having a spacing portion extending inwardly from said cover-ring, a plurality of annularly spaced spring actuated retaining dogs pivotally mounted on said spacing portion and engageable with said retaining ring to retain the closure in operative position, a vacuum relief valve movable in said closure and engageable with said dogs for disengaging the dogs from said retaining ring to permit the removal of the closure from said rim portion, a detent on said relief valve for retaining the valve in dog engaging position, and means for releasing said detent.

6. In a device of the kind described and in combination with the neck portion of a filler opening, a retaining ring mounted therein, a closure comprising a cover-ring removably mounted on said neck portion and having a portion extending inwardly from the cover-ring, a plurality of retaining dogs movably mounted on the inwardly extending portion of said cover-ring and engageable with said retaining ring, a pressure relief valve mounted in and operatively related to said cover-ring, a vacuum relief valve operatively related to said pressure relief valve and movable inwardly with respect thereto into engagement with said dogs for disengaging the dogs from said retaining ring, and a detent for retaining said vacuum relief valve in dog engaging position.

7. In a device of the kind described and in combination with the neck portion of a filler opening, a retaining ring mounted therein, a closure comprising a cover-ring removably mounted on said neck portion and having a portion extending inwardly from the cover-ring, a plurality of spring actuated retaining dogs pivotally mounted on the inwardly extending portion of said cover-ring and engageable with said retaining ring for retaining the closure in operative position, a pressure relief valve of ring-like form mounted within and operatively related to said cover-ring, a vacuum relief valve of annular form positioned within and operatively related to said pressure relief valve, said vacuum relief valve being movable inwardly with respect to said pressure relief valve and into engagement with said dogs for disengaging the dogs from said retaining ring, and a detent for yieldingly retaining said vacuum relief valve in dog engaging position.

8. In a device of the kind described and in combination with the neck portion of a filler opening, a retaining ring mounted therein, a closure comprising a cover-ring removably mounted on said neck portion and having a portion extending inwardly from the cover-ring, a plurality of spring actuated retaining dogs pivotally mounted on the inwardly extending portion of said cover-ring and engageable with said retaining ring for retaining the closure in operative position, a spring seated pressure relief valve of ring-like form mounted within and yieldably engageable with said cover-ring, a spring seated vacuum relief valve of annular form positioned within and yieldably engageable with said pressure relief valve, said vacuum relief valve being movable inwardly with respect to the pressure relief valve, said dogs having portions projecting into the path of the vacuum relief valve when moved inwardly and engageable with said vacuum relief valve for disengaging the dogs from said retaining ring, a spring actuated detent carried by said vacuum relief valve and cooperating with means carried by said cover ring for yieldingly retaining said vacuum relief valve in dog engaging position, and means for releasing said detent to permit said vacuum relief valve and retaining dogs to return to operative position under the influence of their respective actuating springs.

9. In a device of the class described and in combination, a closure comprising a cover-ring adjacent its outer edge provided with a spacing sleeve extending inwardly therefrom, a plurality of annularly spaced brackets secured to the outer side of said sleeve, a valve support surrounding said sleeve and having a portion spaced therefrom to receive said brackets, a plurality of retaining dogs mounted on said brackets and extending through openings in said valve support and said sleeve, resilient means for normally urging said dogs into operative position, a pressure relief valve operatively related to said cover-ring, resilient means operatively related to said valve support for yieldingly retaining said pressure relief valve in closed condition, a vacuum relief valve operatively related to said pressure relief valve and having a stem slidably mounted in said valve support, resilient means for yieldingly retaining said vacuum valve in closed position, said vacuum relief valve being movable inwardly into engagement with said dogs to move the dogs out of operative position against the action of said first mentioned resilient means, and releasable means for retaining said vacuum relief valve in engagement with said dogs.

10. In a device of the class described and in combination, a closure comprising an annular cover-ring adjacent its outer edge, a valve seat adjacent the inner edge of said cover-ring, a spacing sleeve extending inwardly from said valve seat, a plurality of pairs of annularly spaced brackets secured to the outer side of said sleeve, a valve support surrounding said sleeve and having a portion spaced therefrom to receive brackets, a plurality of retaining dogs pivotally mounted between the brackets of the respective pairs and extending through openings in said valve support and said sleeve, resilient means for normally urging said dogs into operative position, a pressure relief valve operatively related to said cover-ring and having studs extending through apertures in said valve support, resilient means adjacent said studs and operatively related thereto and to said valve support for yieldingly retaining said pressure relief valve in closed condition, a guide sleeve mounted in said valve support, a vacuum relief valve operatively related to said pressure relief valve and having a stem slidably mounted in said guide sleeve, resilient means for yieldingly retaining said vacuum valve in closed position, said vacuum relief valve being movable inwardly into engagement with said dogs to move the dogs out of operative position against the action of said first mentioned resilient means, and means on said stem and engageable with said guide sleeve for releasably retaining said vacuum relief valve in engagement with said dogs.

11. In a device of the class described and in combination, a closure comprising an annular cover-ring adjacent its outer edge, a valve seat adjacent the inner edge of said cover-ring, a spacing sleeve extending inwardly from said valve seat, a plurality of pairs of annularly spaced brackets secured to the outer side of said sleeve, a valve support surrounding said sleeve and having a portion spaced therefrom to receive said brackets, a plurality of retaining dogs pivotally mounted between the brackets of the respective pairs and extending through openings in said valve support and said sleeve, resilient means operatively related to said dogs and valve support for normally urging said dogs into operative position, a ring-like pressure relief valve having a facing engageable with the valve seat on said cover-ring and having studs extending through apertures in said valve support, resilient means surrounding said studs and operatively related thereto and to said valve support for yieldingly retaining the facing of said pressure relief valve against the valve seat on said cover-ring, a guide sleeve mounted in said valve support, a vacuum relief valve having a face engageable with the facing on said pressure relief valve and having a stem slidably mounted in said guide sleeve, resilient means for yieldingly retaining the face of said vacuum valve in engagement with the facing of said pressure valve, said vacuum relief valve being movable inwardly into engagement with said dogs to move the dogs out of operative position against the action of said first mentioned resilient means, a detent mounted on said stem and engageable with said guide sleeve for releasably retaining said vacuum relief valve in engagement with said dogs, and means for disengaging the detent from said guide sleeve.

12. In a device of the class described and in combination, a closure having a flush outer surface and comprising an annular cover-ring adjacent its outer edge, a valve seat adjacent the inner edge of said cover-ring, a spacing sleeve extending inwardly from said valve seat, a plurality of pairs of annularly spaced brackets secured to the outer side of said sleeve, a valve support surrounding said sleeve and having a portion spaced therefrom to receive said brackets, said valve support having a spider-like bottom portion, a plurality of retaining dogs pivotally mounted intermediate their ends between the brackets of the respective pairs and extending outwardly through openings in said valve support and inwardly through openings in said sleeve, resilient means for normally urging said dogs into operative position, a ring-like pressure relief valve within and operatively related to said cover-ring, said relief valve having studs extending through apertures in the bottom portion of said valve support, resilient means surrounding said studs and operatively related thereto below the bottom portion of said valve support for yieldingly retaining said pressure relief valve on said valve seat, a guide sleeve mounted in said valve support, a vacuum relief valve within and operatively related to said ring-like pressure relief valve, said vacuum valve having a stem slidably mounted in said guide sleeve, resilient means for yieldingly retaining said vacuum valve in closed position with relation to said pressure relief valve, said vacuum relief valve being movable inwardly into engagement with said dogs to move the dogs out of operative position against the action of said first mentioned resilient means, a detent pivotally mounted on said stem and engageable with said guide sleeve for releasably retaining said vacuum relief valve in engagement with said dogs, and means slidably mounted on said guide sleeve and engageable with said detent for moving the detent out of engagement with the guide sleeve.

13. In a device of the class described and in combination, a closure having a flush upper surface and comprising an annular cover-ring adjacent its outer edge, a valve seat adjacent the inner edge of said cover-ring, a spacing sleeve extending inwardly from said valve seat, a plurality of annularly spaced brackets secured to the outer side of said sleeve, a valve support surrounding said sleeve and having a portion spaced therefrom to receive said brackets, said valve support having a spider-like bottom portion, a plurality of retaining dogs pivotally mounted intermediate their ends on said brackets and extending outwardly through openings in said valve support and inwardly through openings in said sleeve, resilient means positioned between the inwardly extending portions of said dogs and the bottom portion of said valve support for normally urging the outwardly extending portion of said dogs into operative position, a ring-like pressure relief valve within and operatively related to said cover-ring, said relief valve having studs extending through apertures in the bottom portion of said valve support, resilient means surrounding said studs and operatively related thereto and to said valve support for yieldingly retaining said pressure relief valve on said valve seat, a guide sleeve mounted in said valve support, a vacuum relief valve within and adapted to engage a portion of the face of said ring-like pressure relief valve, said vacuum valve having a stem provided with a recess and slidably mounted in said guide sleeve, resilient means for yieldingly retaining said vacuum valve in closed position with relation to said pressure relief valve, said vacuum relief valve being movable inwardly into engagement with said dogs to move the dogs out of operative position against the action of said first mentioned resilient means, a detent pivotally mounted on said stem within said recess and engageable with said guide sleeve for releasably retaining said vacuum relief valve in engagement with said dogs, and a spring actuated tubular member surrounding said guide sleeve and slidably mounted thereon to engage said detent for moving the detent out of engagement with the guide sleeve.

WILLIAM A. LEBUS.